United States Patent [19]
Haswell

[11] 4,307,809
[45] Dec. 29, 1981

[54] TAPE CASSETTE STORAGE CONTAINER
[75] Inventor: Robert F. Haswell, London, England
[73] Assignee: Gilfin International (F.T.) Ltd., London, England
[21] Appl. No.: 47,485
[22] Filed: Jun. 11, 1979
[30] Foreign Application Priority Data Sep. 29, 1978 [GB] United Kingdom ............... 38630/78

[51] Int. Cl.³ .......................... B01D 15/00; C02F 1/42
[52] U.S. Cl. ...................................... 211/40; 206/387; 248/314
[58] Field of Search ....................... 211/40, 55, 88, 13; 248/314; 206/123, 128, 387

[56] References Cited
U.S. PATENT DOCUMENTS

| | | | |
|---|---|---|---|
| 2,105,594 | 1/1938 | Henrich | 211/88 X |
| 3,889,817 | 6/1975 | Berkman | 211/163 |
| 3,917,067 | 11/1975 | Brown et al. | 206/387 |
| 3,926,314 | 12/1975 | Dogliotti | 248/150 X |
| 4,039,134 | 8/1977 | Redmer | 248/205 A |
| 4,087,145 | 5/1978 | Weavers | 206/387 X |
| 4,203,519 | 5/1980 | Fujitaki | 206/387 |

FOREIGN PATENT DOCUMENTS

| | | |
|---|---|---|
| 2712213 | 9/1978 | Fed. Rep. of Germany ........ 211/88 |
| 345410 | 3/1931 | United Kingdom . |
| 1408516 | 10/1975 | United Kingdom . |
| 1440095 | 6/1976 | United Kingdom . |
| 1446805 | 8/1976 | United Kingdom . |
| 1456066 | 11/1976 | United Kingdom . |
| 2011354 | 7/1979 | United Kingdom . |

Primary Examiner—J. Franklin Foss
Attorney, Agent, or Firm—Emory L. Groff, Jr.

[57] ABSTRACT

A tape cassette storage container comprises a rigid backing frame member (50, 51, 56, 57), provided on one side with fastening means for attachment of the container to a support member, and a series of successive adjacent storage compartments or pockets (61) for individual tape cassettes (65), in which the cassettes (65) are stored generally edge-to-edge, so that the cassettes (65) lie generally parallel or at a slight inclination to the plane of the backing frame member (50).

3 Claims, 5 Drawing Figures

TAPE CASSETTE STORAGE CONTAINER

This invention relates to tape cassette containers and is particularly concerned with the storage of tape cassettes in a vehicle.

A tape cassette generally takes the form of a standardised thin rectangular 'slab' or block incorporating a spaced pair of symmetrically disposed tape spools upon which is wound a magnetic recording tape; one longitudinal edge of which slab has an aperture to expose a run of the tape between the spools for access to a recording or playback head on a tape cassette recorder.

Various storage containers for cassettes have been proposed, but these have typically taken a form of bulky rigid bins divided into a series of compartments for individual cassettes and in which the cassettes are arranged face-to-face in a row. Such rigid storage containers are often bulky and intrude unduly into the free space within a vehicle. They may also have a pronounced protruding hard edges which constitute a safety hazard, in the event of impact with the vehicle occupants.

Problems are also encountered in mounting such storage containers for cassettes in a convenient location, in which cassettes are accessible from the driving or passenger seat for insertion into a cassette player, typically mounted at the front of a vehicle (for example, on or adjacent the dash-board, console or transmission tunnel) and yet well out of the way as far as leg room is concerned.

The foregoing problems of conventional rigid storage containers for cassettes are aggravated when it is desired to store a large number of cassettes, for example a dozen or more, because the conventional container becomes unduly large, bulky and cumbersome.

According to the present invention, a tape cassette storage container comprises a rigid backing frame member, for attachment of the container to a support member, and a series of successive adjacent storage compartments or pockets for individual tape cassettes, in which one or more of the cassettes are stored generally edge-to-edge.

In this storage configuration cassettes lie generally parallel or at a slight inclination to the plane of the backing frame member.

Such a storage container need not be very much thicker than the depth of a single cassette and will be of an area depending upon the number of cassette compartments required, but conveniently of no greater width than a single cassette, assuming that the cassettes are stored in a single line or row. Such a configuration is well adapted to allow for mounting on a generally flat surface within the car, for example, a door or other interior trim panel, a side wall of a foot well, or transmission tunnel, the front, upper or lower facias of a dash-board, the roof headlining or a sun visor on the roof, a seat back, or parcel shelf.

Other loose articles can be piled upon the holder while the cassettes therein are still protected and are readily accessible.

The compartments are themselves preferably rigid-walled and are integral with the backing frame member. In fact the entire assembly may be fabricated in one integral moulding, conveniently of synethtic plastics material.

Each compartment may be provided with spring bias means in order to positively engage a cassette therein, to restrain it from removal under normal forces experienced in a moving car, but without obstructing removal when desired by a definite withdrawal action thereof. Such spring bias means conveniently comprise inward indentations of the narrow side edges of the pocket, on opposite sides thereof. These indentations may for example, be formed by introducing parallel slits into the side wall and depressing the wall portion between the slits inwards during the fabrication process. Alternatively the projections may be integrally moulded into the container side walls.

The bottom of an individual compartment may be provided with cut-outs and/or outstanding ribs or protrusions in order that the cassette will not rub against the bottom edge. This is important in order that the cassettes may be inserted with the exposed run of tape inwards and without that run of tape rubbing against and deteriorating from contact with the lower edge of the pocket. Thus the tape run is afforded maximum protection against dust etc.

Additional indentations are preferably provided for engaging or locating the tape spools, and in particular the tape spool spindles, in order to restrain movement or rotation thereof under vibrations such as are encountered in a vehicle in motion. This inhibits tape run slackening or even unwinding, which may result in overrapid tape drive take-up action and consequent tape stretching or even breakage when the cassette is subsequently used.

Further indentations may be provided on the opposed flat side surfaces of the individual compartments in order to further spring bias the side surfaces of the cassette inserted therein and to inhibit withdrawal of the cassette.

The cassette desirably protrudes from the compartment when fully inserted, at a marginal edge portion thereof to allow gripping for removal.

The successive adjacent compartments are desirably marginally inset one within another to facilitate feeding of a cassette into a compartment and withdrawal of the cassette therefrom. Moreover, the depth of the compartments may be tapered towards a reducing depth at the inner edge thereof, with the tapered edge of one compartment lying in the mouth of an adjacent compartment.

The configuration of individual compartments may be such as to minimise contact between the pocket walls and a cassette. This may be achieved by, for example, increasing the cut-out area of the pocket walls and utilising projections for local engagement in the cassette body. The cut-out areas are desirably also arranged to expose identification labels applied to the flat sides of cassettes, so that, even in a full container, each individual cassette may be readily identified. This is particularly advantageous for vehicle usage where minimum time for selecting cassettes is desirable, because attention is diverted from driving.

The compartment or pocket disposition on the backing frame member may be adapted to suit the storage area available. Thus, for example, pockets may be arranged edge-to-edge in successive rows, rather than a single row.

Conveniently, the backing member is provided with fastening means.

For example, the backing frame member may be provided with a self-adhesive layer protected by a backing strip, which is peeled back to expose the backing surface to allow installation. Alternatively, some other detachable connection may be provided, whereby the container can be removed as a whole and used as a storage container elsewhere or even held in the hand for general transportation of cassettes.

The backing frame member may be of any appropriate configuration, for example a solid sheet or peripheral framework for supporting said pocket walls.

There now follows a description of some particular embodiments of the invention, by way of example only, with reference to the accompanying drawings, in which.

Figure 1:
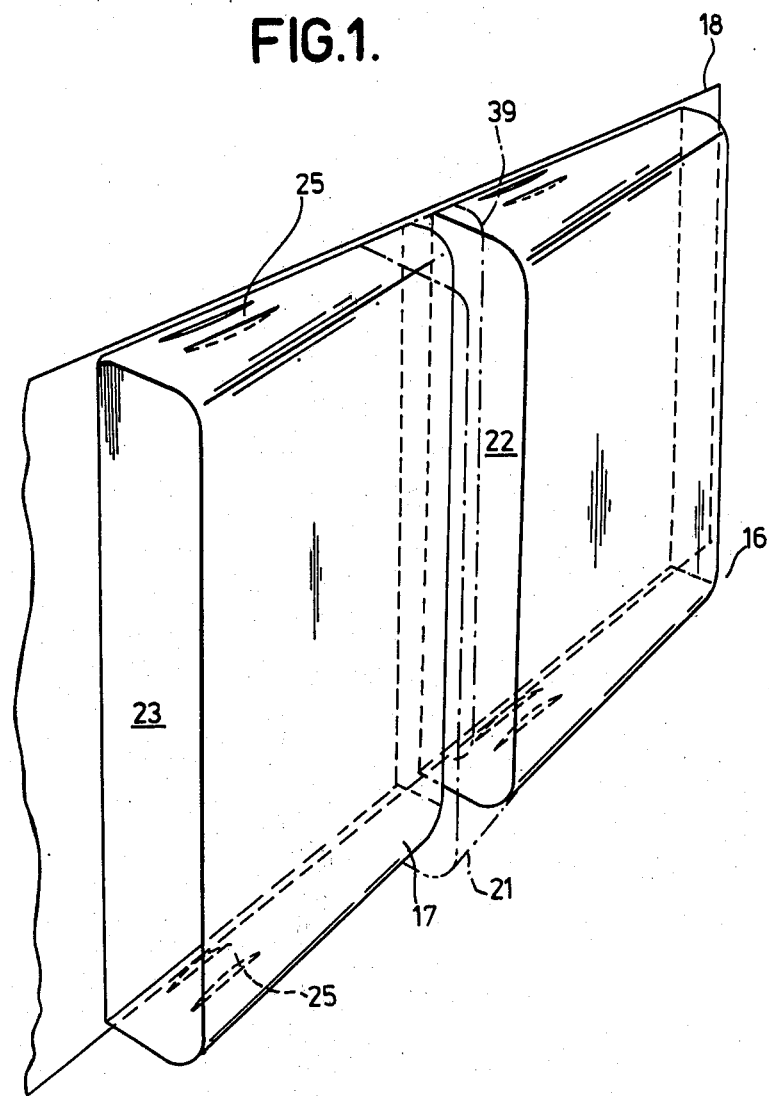
FIG. 1 shows diagrammatically or schematically a general perspective view of part of a tape cassette storage container.
Figure 2:
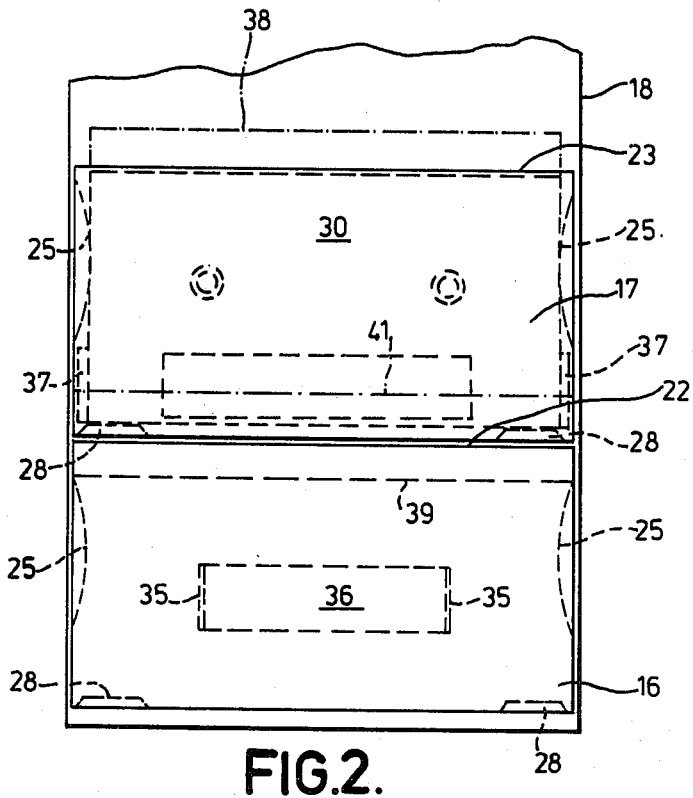
FIG. 2 shows a plan view of the storage container shown in FIG. 1.
Figure 3:
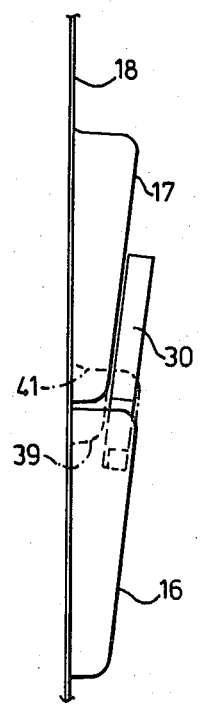
FIG. 3 shows a side elevation of the storage container shown in FIGS. 1 and 2.

Referring to FIGS. 1 to 3, a tape cassette storage container comprises a backing frame member in the form of a rigid sheet 18 provided with a plurality of adjacent rigid-walled pockets or compartments, of which two, referenced 16 and 17 are shown. These compartments may abut one another as illustrated, or may marginally overlap as indicated by the chained line 39 for the bottom edge of a compartment 17 and the chained line 41 for the open edge of an adjacent overlapping compartment 16.

As shown in FIGS. 2 and 3, tape cassettes 30 are introduced into the compartments 16 and 17 through the open edges or mouths 22 and 23 respectively and in their fully inserted positions these cassettes 30 are exposed at their marginal outer edge portions 38 to allow gripping for withdrawal.

In order to secure the cassettes 30 firmly in place and thereby to prevent accidental loss of the cassette during transit, spring biasing means are provided in each compartment 16 and 17 for holding the cassettes 30 in place. Such spring biasing means takes the form of inwardly sprung ribs or indentations 25 of the side edge walls of the compartments 16, 17. These sprung identations 25 engage the side walls of the cassette 30 in the fully inserted position and yet are readily deflected by the projections 37 which are typically found on the side edges of the front of a cassette to allow removal of a cassette 30. It will be seen how these projections 37 inhibit the withdrawal of the cassette from the fully inserted position, because they must pass the projections 25 and deflect the same.

Additional projections such as that shown at 36 may be formed in the side surfaces of the compartment by opposed slits 35 and these operate in a similar manner to the projections 25.

The cassette 30 is inserted into a compartment with its exposed tape run end downwards in order to afford maximum protection to the exposed run of tape.

However, in order to prevent the tape rubbing against the bottom edge of a compartment and thus deteriorating, upstanding ribs 28 are provided at the bottom edge of the compartment. These may be formed integrally with the compartment wall itself. Indeed the rigid walled compartments and the backing frame member may be formed as an integral moulded assembly, for example of synthetic plastics material.

In a preferred construction, the compartments are arranged in series as illustrated and the entire container has the width of generally one tape cassette 30. Other configurations, for example a series of short rows of pockets, are possible according to requirements and in particular according to the space available for a particular installation.

The container is adapted for installation in a motor vehicle, where interior space is often at a premium. It will be seen that the depth of the container is no more than the depth of the deepest part, that is at the open end, of each compartment and this is itself not much greater than the thickness of an individual cassette 30, although the depth, inclination and degree of tapering of each compartment may be adapted to particular requirements. As the cassettes themselves are no more then a quarter of an inch in depth typically, than even if the compartments are twice the cassette depth, the overall thickness need only be of the order of one half an inch to an inch.

Fastening means, for example, an adhesive backing may be provided on the backing frame member, that is the sheet 18, in order to facilitate installation. Alternatively, the fastening means may comprise a positive mechanical fixing, such as a screw, bolt or latch.

Several storage units may be mounted in one and the same location, and to facilitate this the units may be stacked one upon another and/or hinged about a common or series of parallel spines.

The individual unit lends itself to general storage, display and transportation, for example in the hand or in proprietary bags or even purpose-built bags or cases.

A display stand, for example, for promotional point-of-sale display, may comprise a plurality of individual units mounted together.

The individual compartments may be adapted to receive an individual cassette alone or housed in a protective case, in particular those in which they are generally marketed.

Figure 4:
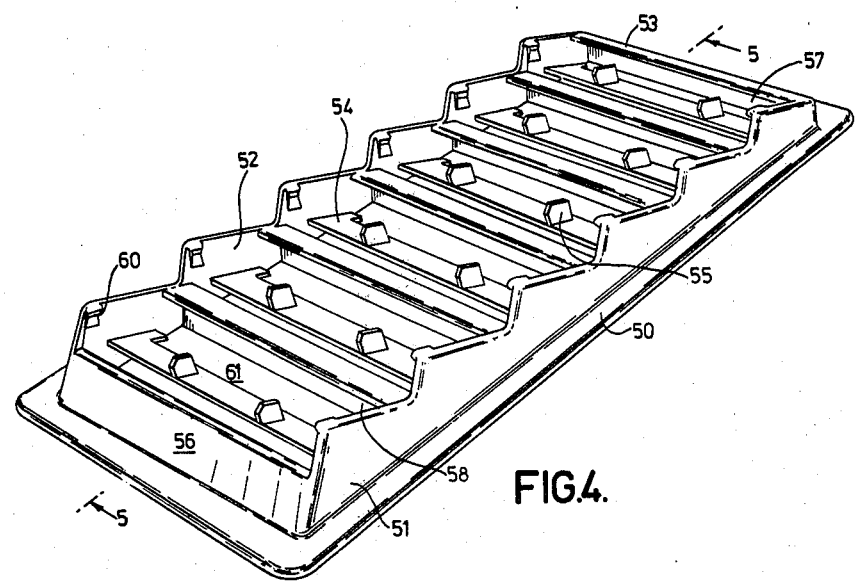
FIG. 4 shows a general perspective view of another embodiment of a cassette container.
Figure 5:
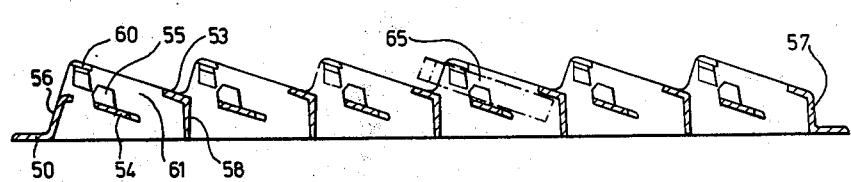
FIG. 5 is a sectional view taken along the line 5—5 in FIG. 4.

A more sophisticated practical or working embodiment of a cassette container according to the invention is shown in FIGS. 4 and 5, referring to which a generally rectangular body of hollow, open-fronted configuration comprising a pair of opposed, longitudinal sides 51 with mutually aligned sawtooth upper edges, supported by shorter end walls 56, 57 linked and bounded by a peripheral flange 50 and together forming a backing frame member by which the whole unit may conveniently be mounted upon a support member, not shown.

A row of six open-fronted pockets 61 for individual tape cassettes 65 is defined by a series of spaced transverse boundary walls 58, between the longitudinal side walls 51, each with an upper lip 53 for engaging and restraining the lower edge of a tape cassette 65 fitted into the relevant pocket. The underside of the cassette is supported by engagement with a bar or ledge 54 extending between inner surfaces 52 of side walls 51 and incorporating a pair of spaced upstanding ribs 55 for locating the tape spools of the cassettes and thereby positively inhibiting movement, and in particular, rotation thereof. The upper front corner edges of the cassette 65 is engaged by projections 60 on the inside of each longitudinal side wall 51. The cassette is thus a snap-action fit in the pocket 61 by local resilient deformation of the projections 60, which have an inclined wedge shaped interior surface to facilitate this action. Thus to insert or withdraw a cassette 65 from a pocket 61 requires slight tilting of the cassette to take it past the projections 60 and a sliding action to engage the projections 55. The latter once engaged with the spools of the cassette 65 also have the effect of inhibiting further inward movement of the cassette 65, the dimensions of the pocket 61 being such that there is a marginal space between the inner open edge of the cassette 65 and the inner wall 58 of the pocket 61 so that the exposed tape run at the inner open edge cannot rub against the wall 58.

The shape of each ledge 54 is such as to accomodate the surface configuration of a tape cassette 65 and in particular the rear edge is indented or cut-away at the mid-portion to accomodate a surface projection of corresponding configuration on the cassette 65 in the region of the tape spools. This affords improved location of a cassette 65 when located in a pocket 61.

Any required number of pockets 61 may be incorporated, for example a lesser number such as five has been found advantageous where installation room for the holder is particularly limited.

Similarly, other pocket configurations than a single straight row may be employed.

The open-fronted pocket configuration enables ready inspection and identification of individual cassettes, even in a full container, by exposing the identification labels commonly applied to the flat side surfaces of cassettes.

I claim:

1. A tape cassette storage container comprising a generally rigid backing frame member, mounting means on said backing frame member for attachment to a support member, a plurality of successive adjacent storage compartments for storing individual tape cassettes with their corresponding edges adjacent and marginally overlying one another in a cross-sectional stepwise configuration, said compartments including opposed side walls, internal projections on opposed internal side surfaces of each compartment side wall providing spring bias means to positively engage the side edges of a cassette therein, a support ledge in each compartment and bridging said side walls, spool locating ribs on each said support ledge to engage and inhibit rotation of the tapes spools of individual cassettes, said storage container being fabricated as an integral moulding of synthetic plastics material.

2. A tape cassette holder as claimed in claim 1 wherein, said mounting means comprises a self-adhesive layer protected by a peelable backing strip.

3. A tape cassette holder as claimed in claim 1 wherein, said compartments are of open-fronted configuration and said side walls are relatively shallow.

* * * * *